United States Patent [19]

Birmingham

[11] 4,094,436
[45] June 13, 1978

[54] APERTURE PLUG

[75] Inventor: Douglas William Birmingham, Ickenham, England

[73] Assignee: TRW Inc., Cleveland, Ohio

[21] Appl. No.: 734,490

[22] Filed: Oct. 21, 1976

Related U.S. Application Data

[63] Continuation of Ser. No. 543,087, Jan. 22, 1975, abandoned.

[51] Int. Cl.² .................... B65D 45/16; B65D 45/00
[52] U.S. Cl. .................................. 220/315; 220/307; 220/308; 220/324
[58] Field of Search ............... 220/315, 307, 308, 323, 220/324, 326

[56] References Cited

U.S. PATENT DOCUMENTS

| | | | |
|---|---|---|---|
| 1,345,487 | 7/1920 | Horton | 220/315 |
| 2,497,827 | 2/1950 | Trafton | 220/324 X |
| 3,944,107 | 3/1976 | Wallace et al. | 220/323 X |
| 3,990,604 | 11/1974 | Barnett et al. | 220/307 |

Primary Examiner—William Price
Assistant Examiner—Steven M. Pollard
Attorney, Agent, or Firm—James R. O'Connor

[57] ABSTRACT

A plug for a panel aperture comprising a plate portion and a plurality of resilient legs which depend from the plate portion and which are shaped to be snap-engagable through the aperture in the panel so that the plate portion is drawn onto the panel thereby at least substantially closing the aperture, wherein the legs are formed by extensions of the plate portion which have been folded back onto the plate portion and then away from the plate portion, whereby the legs project from the plate portion from a position radially inwardly of the periphery of the plate portion leaving the periphery of the plate portion unbroken. The folded portion of each leg is preferably located in a recess in the plate portion so as to lie flush with the undersurface of the plate portion and a sealing member may be provided on the undersurface of the periphery of the plate portion. The sealing member may be a heat softenable plastics material which will harden when heated and cooled to bond the plate portion to the panel in which the plug is mounted.

7 Claims, 7 Drawing Figures

U.S. Patent June 13, 1978 4,094,436
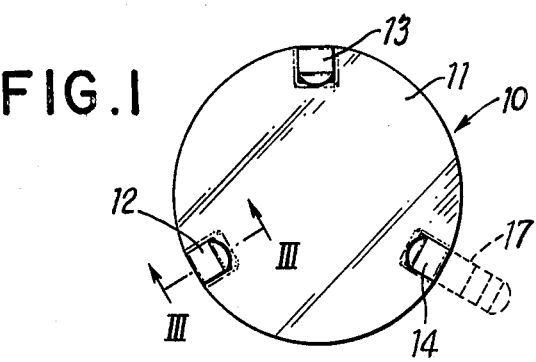
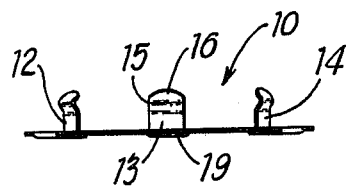
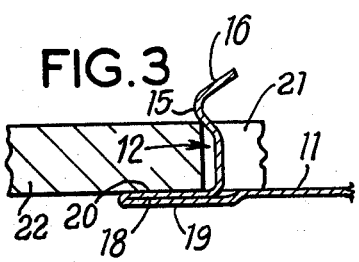
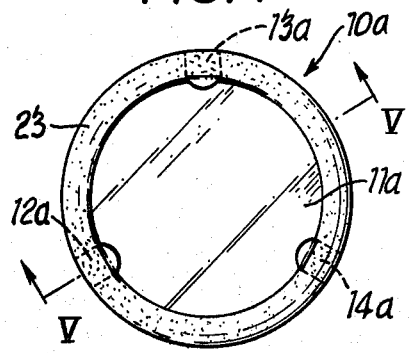
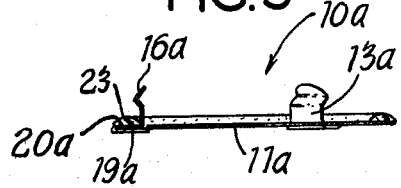
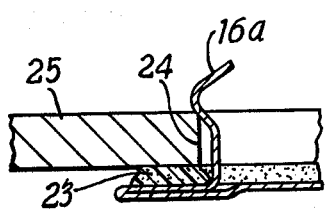
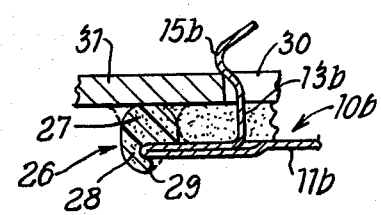

APERTURE PLUG

This is a continuation, of application Ser. No. 543,087, filed Jan. 22, 1975, now abandoned.

BACKGROUND TO THE INVENTION

The present invention relates to a plug for closing an aperture in a panel and in particular to a plug for closing and sealing an aperture in a panel.

It is known to provide a plug for a panel aperture comprising a plate portion and a plurality of resilient legs which depend from the plate portion and which can be snap-engaged through the aperture in the panel so that the plate portion is drawn onto the panel and substantially closes the aperture. Hitherto, the legs have been partially sheared from the plate portion so as to leave gaps in the periphery of the plate portion which reduce the effectiveness of the seal achieved by the plug.

STATEMENT OF THE INVENTION

According to the present invention a plug for a panel aperture comprises a plate portion and a plurality of resilient legs which depend from the plate portion and which can be snap-engaged through the aperture in the panel so that the plate portion is drawn onto the panel and substantially closes the aperture, the legs being formed by extensions of the plate portion which have been folded back onto the plate portion and then away from the plate portion, so that the legs project from the plate portion from a position radially inwardly of the periphery of the plate portion leaving the periphery of the plate portion unbroken.

Preferably, the part of each leg which is folded back onto the plate portion is sealed in a recess formed in the plate portion so as to lie approximately flush with the surface of the plate portion from which the legs project.

In a further aspect the invention provides a method of sealing an aperture in a panel comprising the steps of forming a plug comprising a metal plate portion having a substantially uninterrupted periphery and a plurality of legs each depending from the plate portion from a position spaced radially from the periphery of the plate portion and shaped to be snap-engaged into the aperture in the panel, providing a ring of heat flowable sealing material on the peripheral surface of the plate portion to form a continuous band of sealing material between the periphery of the plate portion and the legs, mounting the plug in an aperture in the panel, heating the panel to a temperature sufficient to cause the sealing material to flow onto any irregularities in the surface of the panel and thereby effectively seal the aperture.

DESCRIPTION OF THE DRAWINGS

FIGS. 1 and 2 are respectively a plan and elevation of a plug,

FIG. 3 is a section taken on the line III — III of FIG. 1, showing the plug located in a panel aperture, FIG. 4 is a plan view of the plug of FIG. 1 with a sealing ring bonded to it, FIG. 5 is a section on the line V — V of FIG. 4, FIG. 6 is an elevation, in section of the plug of FIG. 4 attached in and sealing an aperture in a panel and FIG. 7 is a view similar to FIG. 6 showing a modification of the sealing ring of FIGS. 4 to 6.

DESCRIPTION OF THE PREFERRED EMBODIMENTS

In FIGS. 1 to 3 a metal plug is indicated generally at 10. The plug 10, which is formed from thin sheet steel and rendered resilient during manufacture, comprises a circular plate 11 and three retaining legs 12, 13 and 14. The legs 12, 13 and 14 are equi-angularly spaced around the periphery of the plate 11 and each leg includes an outwardly inclined retaining portion 15 and an inwardly inclined lead-in portion 16.

The legs 12, 13 and 14 are similar to each leg is formed from a tongue 17 (shown in broken lines in FIG. 1) which is formed integrally with the plate 11 and folded back onto the plate 11 to form a fold 18 from which the respective leg projects at right angles and outwardly from the plate 11. A depression 19 is formed in the plate 11 to receive the fold 18 of each tongue so that the outer surface of the fold is flush with adjacent surface of the plate. As can be seen from FIG. 1 the legs 12, 13 and 14 are spaced inwardly from the periphery of the plate 11 so as to leave a continuous annular surface 20 around the periphery of the plate.

The metal plug 10 can be used, as shown in FIG. 3 to close a circular hole 21 in a panel 22. In use, the annular surface 20 is drawn against the outer surface of the panel 22 by the retaining portions 15 of the legs so as to seal the hole adequately for many purposes, for instance it can provide an adequate dust seal. The configuration of the legs also enables the plug to withstand considerable pressure.

If, however, a better seal is required, then a ring seal of resilient or deformable material can be added to form a plug 10a as shown in FIGS. 4 to 6, which incorporates a ring seal 23 formed from a polyvinylchloride based compound such as that sold by W. G. Grace & Co. as PLASTICOL Compound No. 1268.

A layer of the polyvinylchloride based compound is applied to the annular surface 20a of the plug 10a and the compound is cured so as to bond the layer to the plate 11a and form the ring seal 23 which is bonded to the plate 11a around the legs 12a, 13a and 14a.

The plug 10a is then applied to an aperture 24 in a panel 25, as shown in FIG. 6, with the legs 12a, 13a and 14a projecting through the aperture and the rim of the aperture clamped between the inclined retaining portions 15a of the legs and the ring seal 23.

We have found that a suitable polyvinylchloride based compound such as PLASTICOL 1268 can be cured at about 160° C for 1 to 2 minutes so as to bond effectively on the plate 11a. When cooled it becomes non-tacky and has sufficient resilience to form a good seal against a panel aperture taking up surface irregularities. It will subsequently withstand temperatures of up to 250° C and when re-heated it will soften slightly but will not melt or become tacky.

The plug 10a incorporating the sealing ring 23 has been found satisfactory in most conditions where the surface irregularities in the panel are not too great. If either of these conditions are present then we have found it advantageous to form the sealing ring from a material such as a low density polythene which will flow when heated so as to fill all the surface irregularities of both the panel and the plate portion of the plug. An example of a plug 10b having a sealing ring 26, which is formed from a low density polythene is shown in FIG. 7.

The sealing ring 26 is preferably injection moulded, although it can be blanked from sheet material, and comprises an annular sealing portion 27, a web 28 which is of slightly smaller internal diameter than the diameter of the plate 11b, and a retaining rib 29. The ring 26 is stretched and fitted on the plate 11b where it is retained by the rib 29 with the sealing portion 27 located on the annular surface 20b of the plug.

The plug 10b can be transported and handled with the ring 26 located in position by the resilience of the material and by the retaining rib 29. In use, the plug 10b is applied to an aperture 30 in a panel 31, in the same way as the plug 10 or the plug 10a so that the sealing portion 27 surrounds the panel aperture 30 and is trapped between the panel 31 and the plate 11b. The panel and the plug 10b are then subjected to a temperature sufficient to soften the polythene causing it to flow. As the polythene material softens and flows it fills all of the surface irregularities of the panel 31 and of the plate 11b and also bonds to both the panel and the plate as shown in broken lines in FIG. 7 so as to form a watertight seal.

The plug 10b is particularly useful for sealing apertures in vehicle body panels. In such an application, the plug is located in the body panel with the ring 26 loosely fitted on the plate 11b and the body panel and plug are then passed through a vehicle paint oven where they are subjected to temperatures of 140° C–170° C or more. The temperature of the paint oven causes the polythene material of the ring 26 to flow filling irregularities in the panel surface and then bond to the panel and plate as it cools.

It will be appreciated that the sealing ring 26 can be attached to the plate portion of the plug in any convenient manner prior to heating and the shape of the sealing ring can also be modified. For instance, the rib 29 could be eliminated and the resulting sealing ring temporarily adhered to the plate portion prior to heating. Alternatively, the sealing ring can be attached to the plate portion of the plug with the aid of prongs, sheared from the plate portion.

It will also be appreciated that the material from which the sealing ring is formed can be varied and will be suited to the particular conditions under which the plug is used.

The number of legs provided on any of the plugs of the present invention can be varied, for instance, two or more legs can be provided to suit the particular application in which the plug is to be used. In addition, the shape of the plate portion of the plug can be varied, for instance, it can be externally oval, square or elongate and can also be curved to fit a curved surface.

What I claim is:

1. A one-piece plug for a panel aperture comprising a plate member having a flat, planar inside face portion, a peripheral edge and a plurality of resilient legs which depend from said plate member from the inside face portion side thereof adjacent said peripheral edge, said plate member having a plurality of spaced recesses embossed on the inside face thereof and adjacent each leg and said peripheral edge, said legs being formed by extensions of the plate member, each leg having: a first portion integrally joined to said peripheral edge which is folded back onto the inside face portion of said plate member and is positioned within said recesses and abutting the bottom of said recesses so as to lie substantially flush with and substantially in coplanar relationship with the said inside face portion of said plate member, each of said recesses having a width substantially equal to said first portions of said legs, a second portion which extends substantially at right angles to said plate member, and a third portion extending from said second portion, said third portion including a retaining part and an inwardly inclined lead-in part, said second and third portions of each of said legs projecting from the plate member at a position radially inwardly of said peripheral edge thereby leaving said peripheral edge of said plate member unbroken.

2. A plug as claimed in claim 1 including a sealing member of deformable material located on the plate member outside the legs so as to overlie at least a part of the folded back portions of the legs.

3. A plug as claimed in claim 2 in which the sealing member is adhered to the plate member.

4. A plug as claimed in claim 2 in which the sealing member has a groove arranged to contain the periphery of the plate member.

5. A plug as claimed in claim 2 in which the sealing member is cured and bonded to the plate member.

6. A plug as claimed in claim 2 in which the sealing member is of a flowable plastics material.

7. A one-piece plug for a panel aperture comprising a plate member having a flat, planar inside face portion, a peripheral edge and a plurality of resilient legs which depend from said plate member from the inside face portion side thereof adjacent said peripheral edge, said plate member having a plurality of spaced recesses embossed on the inside face thereof and adjacent each leg and said peripheral edge, said legs being formed by extensions of the plate member, each leg having: a first portion integrally joined to said peripheral edge which is folded back onto the inside face portion of said plate member and is positioned within said recesses and abutting the bottom of said recesses so as to lie substantially flush with and substantially in coplanar relationship with the said inside face portion of said plate member, each of said recesses having a width substantially equal to said first portions of said legs, a second portion which extends substantially at right angles to said plate member, and a third portion extending from said second portion, said third portion including a snap engaging knee formed by an outwardly inclined retaining part and an inwardly inclined lead-in part, said second and third portions of each of said legs projecting from the plate member at a position radially inwardly of said peripheral edge thereby leaving said peripheral edge of said plate member unbroken.

* * * * *